Nov. 5, 1963    R. BECKADOLPH ETAL    3,109,202
MOLD FOR USE IN CONNECTION WITH THE
CASTING OF TRANSMISSION BELTS
Filed Dec. 29, 1959    4 Sheets-Sheet 1

INVENTORS:
Richard Beckadolph
Walter Niclas

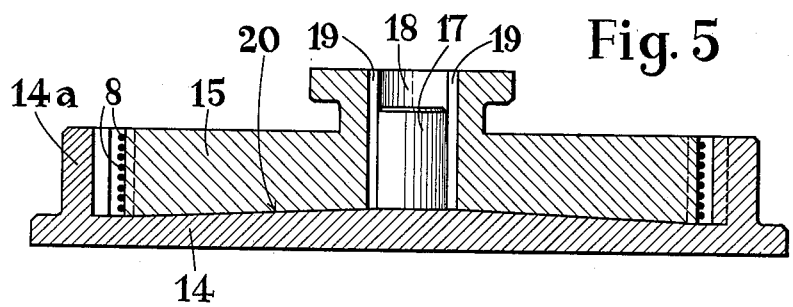
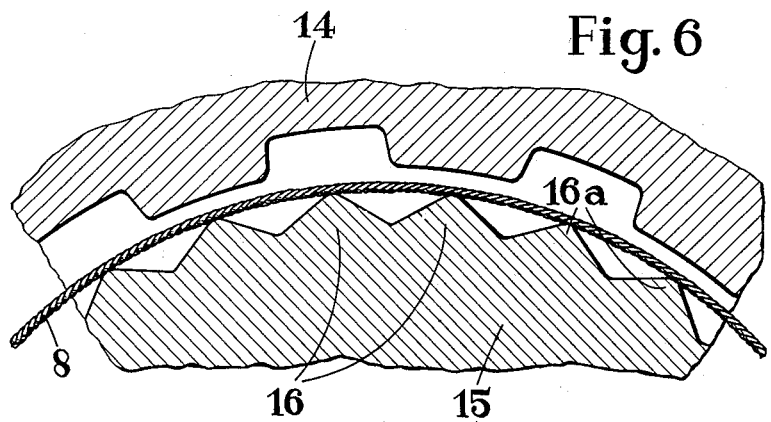
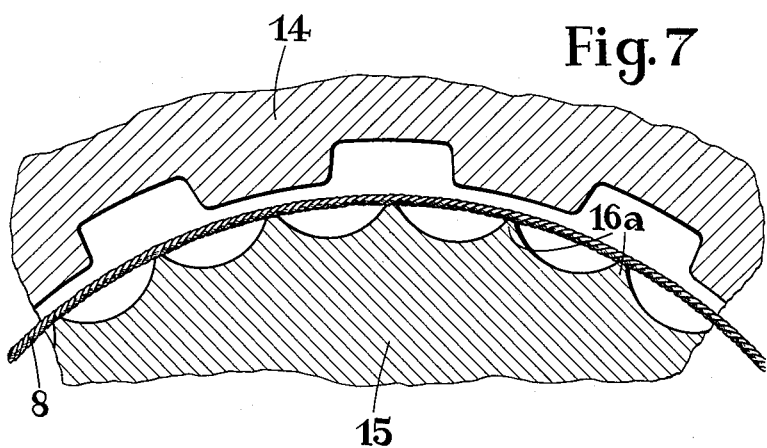

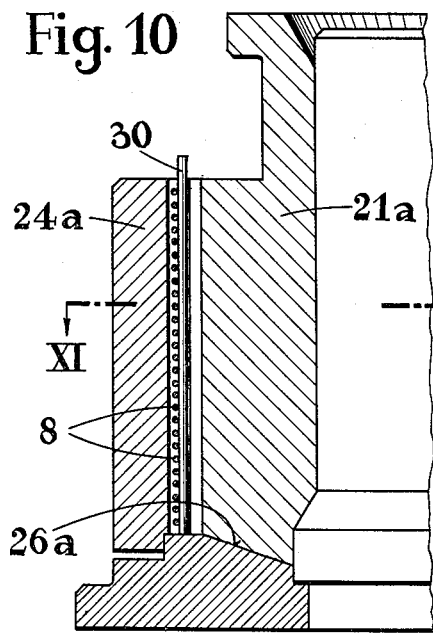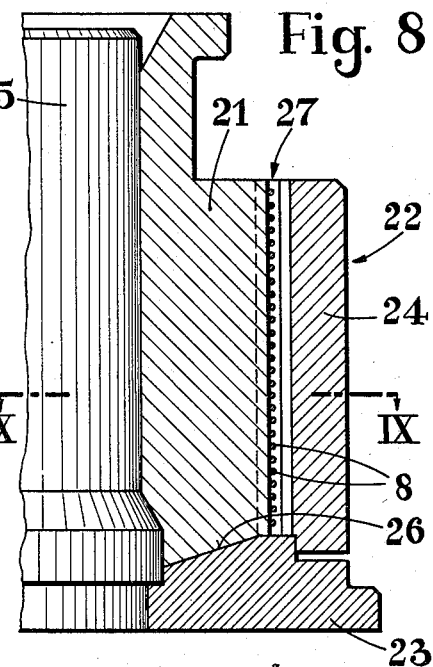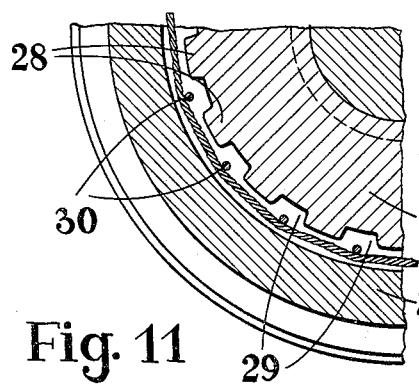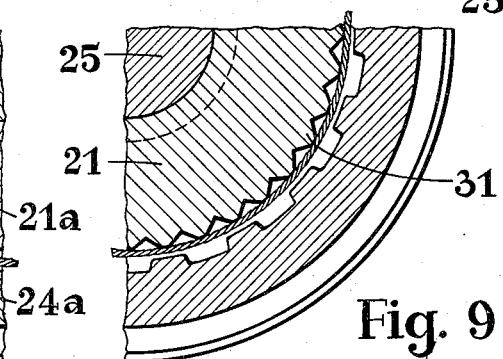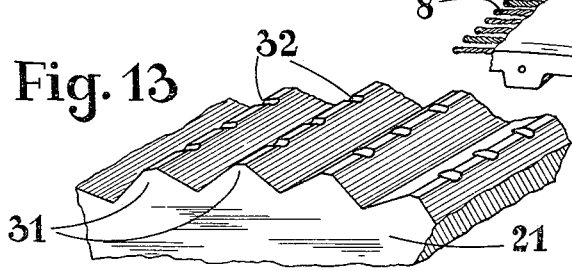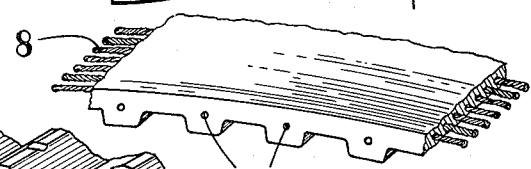

Nov. 5, 1963 R. BECKADOLPH ETAL 3,109,202
MOLD FOR USE IN CONNECTION WITH THE
CASTING OF TRANSMISSION BELTS
Filed Dec. 29, 1959 4 Sheets-Sheet 4

INVENTORS:
Richard Beckadolph
Walter Niclas

United States Patent Office 3,109,202
Patented Nov. 5, 1963

3,109,202
MOLD FOR USE IN CONNECTION WITH THE CASTING OF TRANSMISSION BELTS
Richard Beckadolph, Grasdorf, and Walter Niclas, Altwarmbuchen, Uber Hannover, Germany, assignors to Continental Gummi-Werke Aktiengesellschaft, Hannover, Germany
Filed Dec. 29, 1959, Ser. No. 862,706
Claims priority, application Germany Oct. 9, 1952
12 Claims. (Cl. 18—36)

The present invention relates to molds for use in connection with the making of precision transmission belts with meshing teeth, especially high-speed belts, and is a continuation-in-part application of our co-pending application Ser. No. 369,272 now abandoned.

It stands to reason that a precision belt equipped with meshing teeth and provided with reinforcing inserts as it may be used, for instance, as transmission belt between a sewing machine unit and the motor therefor, will work properly only, if it is true to size which means that if the spirally wound reinforcing inserts for instance in form of reinforcing wires are precisely located within the belt body and firmly anchored thereto and if the machine teeth are evenly spaced from each other and have a proper uniform width. It should be noted that tolerances of such a belt must be within fractions of millimeters if the above requirements are to be met.

It will also be obvious that any belt which is not initially made endless and seamless can impossibly meet these high precision requirements. In other words, a belt made as a belt with two ends and subsequently spliced and/or fused cannot meet these high precision requirements. Furthermore, in order to be able to meet such high precision requirements, the belt must on one hand contain non-stretchable reinforcing inserts, but on the other hand must be as thin as will be permissible under the circumstances to meet the requirements of strength so that the belt will be highly flexible. Unless the belt is highly flexible, the necessary precision requirement cannot be met.

Various attempts have heretofore been made in an effort to produce high precision belts of the above general type. However, the employed methods were too complicated and, consequently, the belts were too expensive, aside from the fact that also the quality of the belts did not always come up to the required standards.

It is, therefore, an object of the present invention to provide a mold which will make it possible to produce endless precision belts, which will overcome the above mentioned drawbacks.

It is another object of this invention to provide a mold for use in connection with the making of toothed high precision belts, which will make it possible to cast such precision belts with reinforcing inserts in a simple manner and with highest precision.

It is also an object of this invention to provide a mold of the type set forth in the preceding paragraphs, which will permit the casting of precision belts with reinforcing wire inserts while securing the wire inserts in the mold against any possible displacement.

These and oother objects and advantages of the invention will appear more clearly from the following specification in connection with the accompanying drawings, in which:

FIG. 5 shows a mold according to the invention for making a high precision belt.

FIG. 6 shows a portion of the mold of FIG. 5 for producing the belt shown in FIGS. 1 and 2.

FIG. 7 shows a portion of a slight modification of the mold of FIG. 5 for producing the belt shown in FIG. 4.

FIG. 8 shows a section through a mold somewhat modified over the mold of FIG. 5 for producing a belt according to FIGS. 1 and 2.

FIG. 9 is a section along the line IX—IX of FIG. 8.

FIG. 10 represents a section through a portion of a mold slightly differing from the mold of FIGS. 8 and 9.

FIG. 11 is a section along the line XI—XI of FIG. 10.

FIG. 12 shows a portion of a belt made by means of the mold of FIGS. 10 and 11.

FIG. 13 shows a detail for facilitating the uniform placing of the reinforcing wires on the mold core.

*General Arrangement*

The mold according to the present invention for making belts of organic elastic synthetic material comprises a container for receiving the said synthetic material in liquid condition anl also comprises a movable member adapted to enter said container and during its movement into said container to displace said synthetic material upwardly. The mold according to the invention is characterized primarily in that that surface which faces the bottom of said container is inclined and that the highest point of the inclination of said inclined surface leads to a passage for venting air bubbles in the material received by said container.

According to a further feature of the invention, the periphery of the member to be inserted into the container is provided with spaced elevations for holding the reinforcing inserts.

*Structural Arrangement*

Figure 1:
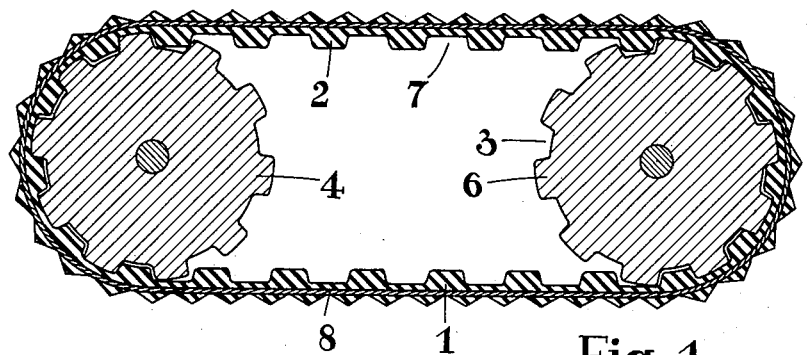
FIG. 1 is a section through a precision belt made by means of a mold according to the present invention, and also shows the pulley meshing with said belt.
Figure 2:
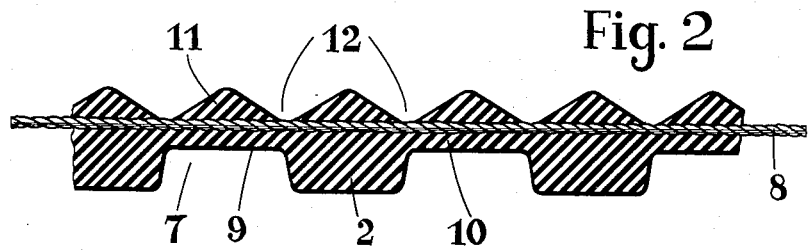
FIG. 2 is a longitudinal section through a portion of the belt of FIG. 1 but on a scale considerably enlarged over that of FIG. 1.
Figure 3:
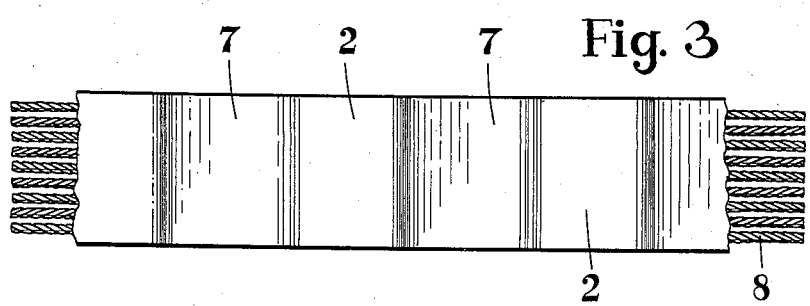
FIG. 3 is a portion of the bottom view of the belt shown in FIG. 1 but likewise on a larger scale than that of FIG. 1.

Referring now to the drawings in detail, and FIGS. 1 and 2 thereof in particular, FIG. 1 shows a belt made according to a mold of the present invention and is generally designated with the reference numeral 1. This belt is provided with precision teeth 2 which mesh with tooth spaces 3 of pulleys 4 and 5, while the teeth 6 of said pulleys mesh with corresponding tooth spaces 7 of belt 1. As will be evident from FIGS. 1 and 2, belt 1 is provided with reinforcing means in form of a wire 8 which is spirally wound throughout the length of the entire belt. The individual windings may or may not be spaced from each other in transverse direction of the belt (see FIG. 3).

Figure 4:
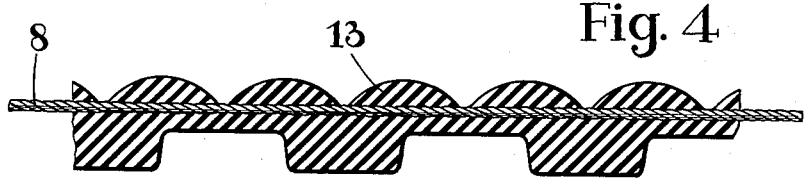
FIG. 4 is a longitudinal section through a portion of a belt made by means of a modified mold according to the invention.

As will also be evident from FIGS. 1 and 2, the wire 8 is spaced from the dedendum line 9 by a layer 10. Actually the wire 8 is placed on the back of the belt and held thereon by ridges 11 which are spaced in longitudinal direction of the belt so that longitudinally spaced portions 12 of the wire are exposed toward the outside and can actually be felt from the outside by the fingernail. While according to FIG. 2 the ridges 11 are of a triangular cross section, it is, of course, to be understood that these ridges which anchor the reinforcing wire to the back of the belt may also be of different cross section. Thus, the anchoring parts 13 of the modification shown in FIG. 4 are of a segmental shape.

The belt shown in FIGS. 1 to 4 consists of pourable or castable material, preferably of a material selected from the group consisting of polyurethanes and polyamides, and can easily be produced in a relatively inexpensive manner by a mold according to the present invention as shown for instance in FIG. 5. This mold comprises two portions, namely an outer portion 14 in form of a container and an inner portion 15 which may also be called a mandrel and is adapted to be inserted into the outer portion 14. The inner contour of the outer portion 14 corresponds to the contour of the teeth of the belt to be made, as is particularly clearly shown in FIG. 6 for a belt of the type shown in FIGS. 1 and 2. The outer contour of the inner portion 15 corresponds to the outer contour of the belt shown in FIGS. 1 and 2. As will be evident from FIG. 6, the inner and outer portions of the mold confine therebetween an annular chamber which eventually will receive the castable material for the belt in liquid condition. Also the reinforcing inserts such as wires 8 will be received in said annular chamber. FIG. 6 clearly shows that the portion 16a of the ridges or elevations 16 serve as supporting means for the wire 8 when the latter is tightly wound around the inner portion of mandrel 15.

The outer portion 14 of the mold with its annular flange-like portion 14a has centrally connected thereto a guiding member 17 which receives a bore 18 of the inner mold portion 15. The said bore 18 is furthermore provided with venting grooves 19.

As will also be evident from FIG. 5, the bottom of the outer mold portion 14 has an inclined surface 20, while the bottom surface of the inner mold portion 15 is inclined accordingly.

In order to prepare a belt according to the present invention, the inner mold portion 15 is first removed from the outer mold portion 14. Thereupon, the reinforcing means for instance the wire 8 is spirally wound around the periphery of the inner mold portion 15 so that the respective elevations 16 tightly support the wire as shown in FIG. 6, the spiral windings of said wire being substantially evenly spaced from each other in the direction of the axis of the guiding member 17 (FIG. 5). After the wire 8 has been properly located on the inner mold, the molten material of which the belt is to be made is poured into the outer mold portion 14, but only up to a certain extent. Thereupon, the inner mold portion 15 is inserted into the outer mold portion so that the inner mold portion displaces the poured-in material which latter will then move into the space between the outer periphery of the inner mold portion and the inner periphery of the outer mold portion, while air bubbles in the poured material will escape primarily through the venting grooves 19. It is, of course, to be understood that the quantity of material initially poured into the outer mold portion 14 prior to the insertion of the inner mold portion 15 should be such that the excess material displaced from the mold when inserting the inner mold portion will be held to a minimum.

The belt shown in FIG. 4 is made according to the same method as just described. In this instance, however, the contour of the periphery of the inner mold portion will, of course, be slightly different, namely as shown in FIG. 7, so as to conform with the anchoring parts 13 of the belt shown in FIG. 4.

FIGS. 8 and 9 illustrate a modification of the mold shown in FIG. 5. As will be seen from FIGS. 8 and 9, the inner and outer mold portions 21 and 22 are relatively higher with regard to their outer diameters than is the case with the mold of FIG. 5. Furthermore, the outer mold portion 22 consists of a bottom portion 23 having connected thereto, for instance by bolts (not shown in the drawings), an annular portion 24 the inner contour of which corresponds to the teeth of the belt to be formed, in this instance the belt of FIG. 1. The inner mold portion 21 has a peripheral contour corresponding to that of the inner mold portion 15, i.e. corresponding to the contour of the anchoring or ridge portions 11. The bottom portion 23 of the mold of FIGS. 8 and 9 has likewise a central guiding bolt 25 connected thereto for receiving the inner mold portion 21. The top surface 26 of the bottom portion 23 is likewise inclined but in a direction opposite to the direction of inclination of the top surface 20 of the mold of FIG. 5.

The use of the mold of FIGS. 8 and 9 is substantially the same as that described in connection with FIG. 5. However, any air bubbles in the mold or in the material in the mold will in the case of the mold of FIG. 8 escape at 27.

It should be noted that both the molds of FIG. 5 and of FIGS. 8 and 9 remain open after the respective inner mold portions have been fully inserted into their outer mold portions pertaining thereto. In other words, the only pressure acting upon the poured material after the molds are in assembled condition is the atmospheric pressure. This is highly important inasmuch as in this way the wire inserts once tightly wound around the inner mold portion are not subjected to any pressure which could possibly displace the wire inserts. In other words, once the wire inserts have been tightly wound around their respective inner mold portions or mandrels, they will safely stay in their respective positions with the wire windings spaced in the desired manner since during the forming of the belt no pressure is exerted upon the latter except atmospheric pressure. The proper location of the wire inserts is, therefore, assured and maintained and will be retained in the finished belt.

After the poured substance has solidified, the inner mold member is removed from the outer mold member whereupon the belt can be removed. Thereupon, the outside of the formed belt is turned inwardly, and the belt is ready for use.

The mold shown in FIGS. 10 and 11 is substantially similar to the mold of FIGS. 8 and 9, and, accordingly, corresponding parts in FIGS. 10 and 11 have been designated with the same reference numerals as in FIGS. 8 and 9, however, with the additional character a. The mold of FIGS. 10 and 11 differs from the mold of FIGS. 8 and 9 merely as to the peripheral contour of the inner and outer mold portions. As will be seen from FIG. 11, the inner mold portion 21a has its periphery provided with tooth spaces 29 corresponding to the teeth of the belt to be made and with teeth 28 corresponding to the tooth spaces of the belt to be made. Provided within the hollow annular space between the inner mold member 21a and the outer mold member 24a in spaced relationship thereto are steel pins 30 which are firmly held in the mold bottom portion 23 in any convenient manner. A thin steel cable, wire, or the like is then wound around said pins in a plurality of windings, as is clearly evident from FIGS. 10 and 11.

The making of the belt by means of this mold follows the same procedure as described above in connection with the mold of FIGS. 5 and 6. After the belt has been poured and has solidified, first the inner mold member is withdrawn and thereupon the belt is removed while being pulled off from said pin 30. The finished belt is shown in FIG. 12 which also shows the bores 31 caused by pin 30, which bores, however, have no harmful effect.

In order to facilitate the winding of the wire insert around the inner mold member 21, the protruding elevations 31 may be provided with transverse grooves 32 as shown for instance in FIG. 13. In this way, the wire windings will automatically be properly spaced. Similar grooves could, of course, also be provided at the periphery of the inner mold portion of the other molds described above.

It is, of course, to be understood that the present invention is, by no means, limited to the particular molds shown in the drawings but also comprises any modifications within the scope of the appended claims. Thus, it would also be possible to omit the central guiding bolt and to use the cone-shaped bottom surfaces of said inner and outer mold members along which surfaces the said mold members engage each other, for centering the inner mold member in the outer mold member. Of course, in such an instance the bottom of the outer mold member would not have a bore therethrough as is the case for instance with the mold of FIG. 8. Such a mold is shown for instance in FIG. 14.

Figure 14:
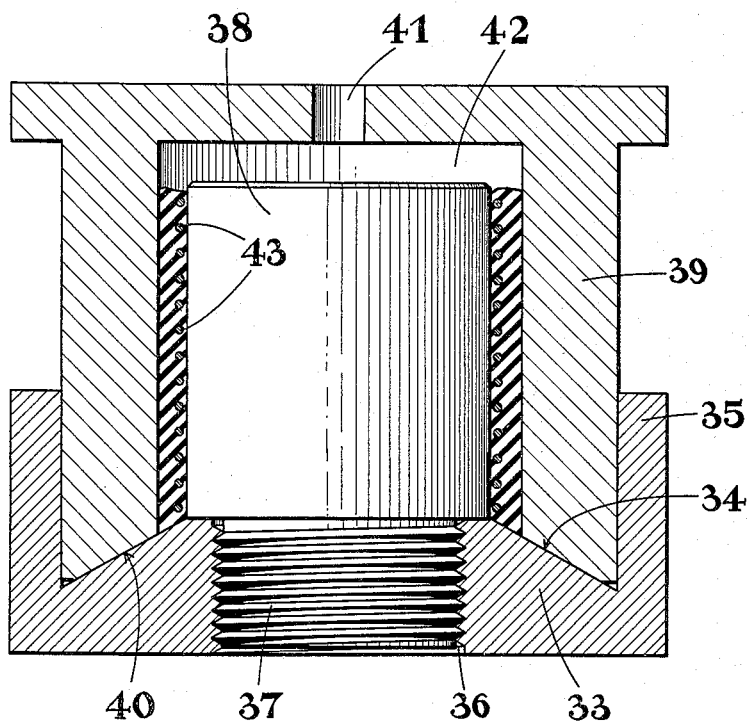
FIG. 14 is a diagrammatic vertical section through a modified mold according to the invention.

The mold illustrated in FIG. 14 is particularly advantageous in connection with the making of belts having a rather small circumference. According to the showing of FIG. 14, the mold comprises an outer mold member 33 with an annular inclined bottom portion 34 and with a flange 35. The central portion of the outer mold member 33 is provided with a thread 36 for receiving the correspondingly threaded portion 37 of a mandrel 38. Thus, the mandrel 38 when screwed into the thread 36 forms a part of the outer mold member 33. The mold furthermore comprises an inner mold member 39 of an inverted cup shape. The annular bottom 40 of the inner mold member 39 is inclined corresponding to the inclination of the annular bottom portion 34 of the outer mold member 33. The inner mold member 39 is furthermore provided with a venting bore 41 for effecting communication between the inner chamber 42 and the outside of the inner mold member 39.

In order to employ this mold for making a belt and assuming that the mold members and elements are separated from each other, first the thin cable or wire 43 is tightly wound around the non-threaded portion of the mandrel 38. Thereupon, the mandrel 38 is by means of its thread 37 screwed into the thread 36 of the outer mold member 33. Then the material from which the belt is to be made is poured into the outer mold member 33. Finally, the inner mold member 39 is lowered into the outer mold member 33 so that said outer mold member gradually displaces the poured material into the space between the inner wall of the inner mold member 39 and the outer wall of the mandrel 38. Any air bubbles in the material will escape into the space above the mandrel 38 and through the bore 41 to the outside.

After the poured material has solidified, the inner mold member 39 is withdrawn and the belt can now be removed.

While according to the foregoing description both the inner mold member and the outer mold member have the bottom surfaces thereof which face each other inclined, it is to be understood that this is the preferred form as shown in the drawings. However, the mold according to the present invention is not limited to such an arrangement, but it rather suffices when the bottom surface of the inner mold member is inclined in such a way that the insertion of the inner mold member will displace the poured material into the passage formed therebetween and containing the wound up cable or wire. It will also be understood that the vent for releasing the air bubbles from the poured material in the mold extends preferably from the highest bottom portion of the inserted mold member in upward direction.

What we claim is:

1. A mold for casting flexible belts with teeth from castable material adapted at room temperature to solidify and to be flexible, which comprises an outer mold member having a conical inner bottom surface and an annular wall connected to said bottom and confining therewith a chamber adapted to receive castable material, an inner mold member removably insertable into and restable on the inner bottom surface of said chamber so as to confine with said outer mold member an annular space and to displace thereinto castable material from said chamber when being inserted into the latter, said inner mold member having a conical bottom surface contiguous with the inner bottom surface of said outer mold members when said inner mold member is rested on the inner bottom surface of said chamber, one wall of said annular space being provided with teeth and the opposite wall of said annular space being provided with ridge-shaped supporting means protruding into said annular space for supporting the windings of a wire insert to be incorporated in the belt to be molded, and air venting means communicating with said annular space during insertion of said inner mold member into said outer mold member for venting air from the castable material in said mold during insertion of said inner mold member into said chamber, said annular chamber being permanently open to the atmosphere when said mold members are in fully assembled position in which the molding operation proper takes place.

2. A mold according to claim 1, in which both the upwardly facing bottom surface of said outer mold member and the downwardly facing bottom surface of said inner mold member have at least some portions thereof inclined at substantially the same angle so that said portions are substantially parallel to each other when said inner mold member is being inserted into said outer mold member.

3. A mold according to claim 1, in which said venting means includes passage means having the mouth thereof at substantially the highest point of inclination of said conical bottom surface of said inner mold member.

4. A mold for casting flexible belts with teeth from castable material adapted at room temperature to solidify and to be flexible, which comprises an outer mold member having a conical inner bottom surface and an upwardly extending annular wall connected to said bottom and also having an upwardly extending mandrel connected to the central portion of said bottom and confining with said annular wall a chamber adapted to receive castable material, and an inner mold member removably insertable into said chamber so as to rest on the inner bottom wall surface of said chamber and to confine with said outer mold member an annular space and to displace into said annular space castable material from said chamber while said inner mold member is being inserted into said outer mold member, one wall of said annular space being provided with teeth and the opposite wall of said annular space being provided with ridge-shaped supporting means protruding into said annular space for supporting the windings of a wire insert to be incorporated in the belt to be molded, said outer mold member being provided with an air venting bore communicating with said annular space for venting air therefrom, the oppositely located bottom portions of said outer and inner mold members respectively having a conical surface tapering in upward direction.

5. A mold for casting flexible belts with teeth from castable material, which comprises: an outer mold member, and an inner mold member arranged for coaxial positioning in and resting on said outer mold member, the outer periphery of said inner mold member and the inner periphery of said outer mold member when in fully assembled and interengaged position confining with each other an annular chamber having a contour corresponding to the contour of the belt to be made and being permanently open to the atmosphere, the outer mold member being cup-shaped and having a slightly conical bottom surface, and the inner mold member having a slightly conical bottom surface in conformity with said conical bottom surface of said outer mold member and resting thereon when said inner mold member is fully inserted into said outer mold member, one wall of said annular chamber being provided with teeth and the opposite wall of said annular chamber being provided with ridge-shaped supporting means protruding into the annular chamber for supporting the windings of a wire insert to be incorporated in the belt to be molded.

6. A mold for casting flexible belts with teeth from castable material, which comprises: an outer cup-shaped mold member having a slightly conical inner bottom surface, a guiding member substantially centrically mounted on and connected to said bottom surface and extending upwardly in axial direction of said outer mold member, and an inner mold member insertable into said outer mold member and provided with a bore for telescopically receiving said guiding member, said inner mold member having a slightly conical bottom surface corresponding to said conical bottom surface of said outer mold member for resting thereon in fully inserted position of said inner mold member, the outer periphery of said inner mold member in fully inserted position of the latter confining with the inner periphery of said outer mold member an annular chamber permanently open at one end and corresponding in contour to the contour of the belt to be made, one wall of said annular chamber being provided with teeth and the opposite wall of said annular chamber being provided with ridge-shaped supporting means protruding into the annular chamber for supporting the windings of a wire insert to be incorporated in the belt to be molded.

7. A mold according to claim 6, which includes venting passage means through said inner mold member for venting air entrapped between said two mold members when the inner mold member is being inserted into the outer mold member.

8. A mold according to claim 5, in which the conical surfaces of said inner and outer mold members taper in upward direction toward the axes of said mold members.

9. A mold according to claim 5, in which the conical surfaces of said inner and outer mold members taper in downward direction toward the axes of said mold members.

10. A mold for casting flexible belts with teeth from castable material, which comprises: an outer mold member, and an inner mold member arranged for coaxial positioning in said outer mold member, the outer mold member being cup-shaped and having a slightly conical bottom surface, the inner mold member having a slightly conical bottom surface in conformity with said conical bottom surface of said outer mold member and resting on the latter when said inner mold member is fully inserted into said outer mold member, the inner periphery of the outer mold member and the outer periphery of the inner mold member confining with each other an annular chamber with teeth forming one wall of said annular chamber and with ridge-shaped supporting means protruding from the opposite wall of said chamber for supporting the windings of wire inserts to be incorporated in the belt to be made, said annular chamber being permanently open to the atmosphere when said mold members are in fully assembled position in which the molding operation proper takes place, the narrowest portions of said annular chamber corresponding to the thinnest portions of the belt to be made.

11. A mold for casting flexible belts with teeth from castable material, which comprises: an outer cup-shaped mold member having its inner periphery provided with teeth corresponding to the tooth spaces of the belt to be cast, said outer mold member also being provided with an inner conical bottom surface, and an inner mold member insertable into the outer mold member and provided with a conical bottom surface for engagement with the conical bottom surface of said outer mold member when fully inserted thereinto, the outer periphery of said inner mold member being provided with circumferentially substantially evenly distributed radially protruding supporting means for supporting the windings of reinforcing wire to be incorporated in the belt to be cast, the outer periphery of said inner mold member confining with the inner periphery of the outer mold member an annular chamber having its minimum width corresponding to the thinnest portion of the belt to be cast.

12. A mold for casting flexible belts with teeth from castable material, which comprises: an outer cup-shaped mold member having its inner periphery designed as a smooth cylindrical surface, said outer mold member also being provided with an inner conical bottom surface, and an inner mold member insertable into the outer mold member and provided with a conical bottom surface engaging said conical bottom surface of said outer mold member when fully inserted thereinto, the outer periphery of said inner mold member being provided with circumferentially substantially evenly distributed teeth and tooth spaces substantially corresponding in shape to the teeth and tooth spaces of the belt to be cast, the outer periphery of said inner mold member being provided with circumferentially substantially evenly spaced supporting means for supporting the windings of a reinforcing wire to be incorporated in the belt to be molded, the outer periphery of said inner mold member and the inner periphery of said outer mold member when said mold members are in fully assembled position confining with each other an annular chamber permanently open to the atmosphere and corresponding in contour to the contour of the belt to be made and having its narrowest portions corresponding to the thinnest portions of the belt to be cast.

References Cited in the file of this patent

UNITED STATES PATENTS

| | | |
|---|---|---|
| 683,979 | Petit | Oct. 8, 1901 |
| 1,898,031 | Carter | Feb. 21, 1933 |
| 1,914,487 | Carter | June 20, 1933 |
| 2,422,266 | Steinke | June 17, 1947 |
| 2,456,580 | Carter et al. | Dec. 14, 1948 |
| 2,507,852 | Case | May 16, 1950 |
| 2,532,080 | Benbow | Nov. 28, 1950 |
| 2,637,071 | Williams et al. | May 5, 1953 |
| 2,642,920 | Simon | June 23, 1953 |
| 2,963,743 | Kraft | Dec. 13, 1960 |

FOREIGN PATENTS

| | | |
|---|---|---|
| 744,907 | Great Britain | Feb. 15, 1956 |